United States Patent [19]

Nishida

[11] Patent Number: 5,682,399
[45] Date of Patent: Oct. 28, 1997

[54] ION LASER TUBE WITH A DISCHARGE TUBULE ADOPTED FOR A HIGH DISCHARGE CURRENT AND A HIGH LASER OUTPUT

[75] Inventor: Kazuhisa Nishida, Tokyo, Japan

[73] Assignee: NEC Corporation, Tokyo, Japan

[21] Appl. No.: 625,363

[22] Filed: Apr. 1, 1996

[30]  Foreign Application Priority Data

Mar. 30, 1995 [JP] Japan .................................. 7-073113

[51] Int. Cl.$^6$ ........................................ H01S 3/03
[52] U.S. Cl. ............................... 372/61; 372/37
[58] Field of Search ........................ 372/61, 37, 62

[56]  References Cited

U.S. PATENT DOCUMENTS

5,235,608  8/1993  Konishi ........................... 372/61
5,319,664  6/1994  Nishida ........................... 372/61
5,325,389  6/1994  Nishida ........................... 372/61
5,381,432  1/1995  Kasahara ......................... 372/61

*Primary Examiner*—Leon Scott, Jr.
*Attorney, Agent, or Firm*—Young & Thompson

[57]  ABSTRACT

A discharge tubule has improved first and second side portions made of a material having a higher resisitvity to the sputtering, for example, any of titanium carbide (TiC), beryllia (BeO) and boron carbide ($B_4C$), wherein the first and second side portions are exposed to a strong sputtering by a plasma gas generated by a large current discharge. The selected material of any of the titanium carbide (TiC), beryllia (BeO) and boron carbide ($B_4C$) makes the discharge tubule free from receiving any damage due to the strong sputtering by the plasma gas generated by the large current discharge and further free from any deformation thereof. This ensures that the ion laser tube has a long life time.

8 Claims, 4 Drawing Sheets

INTENSITY OF MAGNETIC FIELD

FIG. 2B

ION LASER TUBE WITH A DISCHARGE TUBULE ADOPTED FOR A HIGH DISCHARGE CURRENT AND A HIGH LASER OUTPUT

BACKGROUND OF THE INVENTION

The present invention relates to a ion laser tube, and more particularly to an argon or krypton laser tube with a slender discharge tubule and optical windows which are adopted for a large current discharge and a large laser output.

Ion lasers show laser oscillations which are caused by transition between different energy levels of ionized gases such as ionized argon or krypton. In order to obtain a high laser output of such ion lasers, it is required to raise the density of ionized gases in the discharge tubule in the ion laser. In order to facilitate the increase in the density of the ionized gases in the discharge tubule, it is effective to both reduce an inner diameter of the discharge tubule and apply a large discharge current in the discharge tubule. For example, the discharge tubule may be designed so that an inner diameter is in the range of 2-4 millimeters, and also that a discharge current over 30 A is applied to the discharge tubule.

On the other hand, a compact ion laser tube is attractive, which may show a high laser output performance by applying a large discharge current in the range of 60-70 A.

Normally, the efficiency of the laser oscillation of the ion laser is very low, for example, not more than 0.1%. Most of the electrical energy of the current applied to the discharge tubule is converted into a thermal energy which heats up the discharge tubule. In order to prevent the discharge tubule from a considerable damage due to the excess heat generation caused by the conversion of the current applied, it was proposed to provide any cooling system for cooling the discharge tubule. Almost the proposed cooling systems utilize water to cool the discharge tubule. A cathode and an anode are provided at opposite ends of the discharge tubule. In order to increase in the laser oscillation coefficient of the ion laser, it has been proposed to provide at least an electromagnet around the discharge tubule so that the provided electromagnet generates a constant magnetic field in the vicinity of the discharge tubule to thereby confine the discharge plasma along a center axis of the discharge tubule. Increase in the degree of confinement of the discharge plasma results in the increase in the laser oscillation coefficient of the ion laser.

As described above, the oscillation coefficient of the ion laser is normally low, for example, not more than 0.1% since the majority of the electrical power supplied to the discharge tubule is converted into the thermal energy which causes that the discharge tubule is heated up to a high temperature, although the discharge tubule is subjected to the water cooling by the water cooler provided. For this reason, the discharge tubule receives damages due to the excess heating caused by the conversion of most of the electric power to the thermal energy. The discharge tubule thus tends to show a thermal deformation.

Further, the discharge tubule is subjected to the sputtering by the discharge plasma. Namely the inner wall of the discharge tubule is sputtered whereby sputtered molecules or atoms of a material of the discharge tubule tend to adhere on optical windows which are provided at opposite ends of the discharge tubule. The adhesion of the sputtered molecules or atoms of the material of the discharge tubule means that the optical windows are polluted by the sputtered molecules or atoms. Such pollution of the optical windows by the sputtered molecules or atoms results in a reduction in the laser output power. In the above circumstances, in order to avoid the above problems, it is further required that the ion laser tube has a thermal radiation feature.

Figure 1:
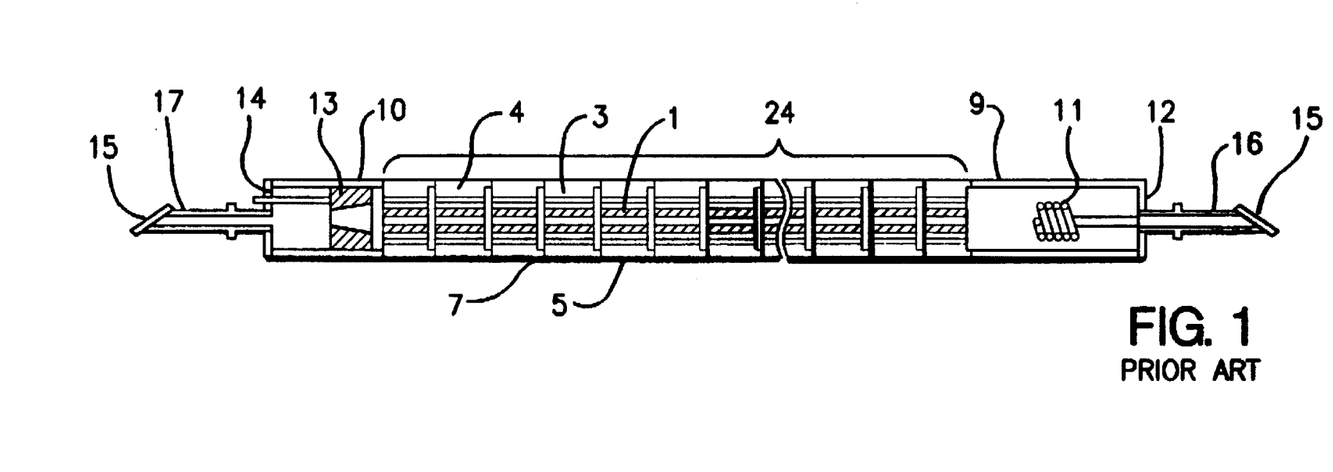
FIG. 1 is a cross sectional elevation view illustrative of the typical conventional ion laser tube.

A first conventional ion laser tube is disclosed in the Japanese Laid-open Patent Application No. 63-184378. The structure of the first conventional ion laser tube is illustrated in FIG. 1. A discharge tubule 1 is made of silicon carbide SiC and tungsten W. The discharge tubule 1 is enclosed by an enclosure tube 4 having a larger diameter than that of the discharge tubule. The enclosure tube 4 is made of aluminum nitride AlN so that the enclosure tube 4 has a high thermal conductivity and a high sealing function. A cathode 11 and an anode 13 are provided at opposite ends of a discharge portion 4 of the ion laser tube. Optical windows 15 are provided at opposite ends of the ion laser tube. The aluminum nitride enclosure tube 4 contributes to radiate a heat to the exterior of the laser tube so as to prevent that the inner wall of the discharge tubule 1 from receiving damages due to the sputtering by the high density plasma confined in the discharge tubule 1. This is to obtain a long life time of the ion laser tube. It was confirmed that the life time of the above conventional laser tube is 2000:3000 hours provided a current is 30 A and a power is 6 W.

A second conventional ion laser tube is disclosed in the Japanese Laid-open Utility Model Application No. 3-34260. The conventional ion laser tube is characterized in that an intermediate tube made of beryllia ceramic is provided, which has a diameter smaller than that of the enclosure tube and larger than that of the discharge tubule. The intermediate tube is accommodated within the enclosure tube and the discharge tubule is accommodated within the intermediate tube.

A conventional ion laser tube of the third, type is disclosed in the Japanese Laid-open Patent Applications Nos. 64-084763 and 62-209878. Beryllia ceramic is useful for tubule of air-cooled argon gas laser tube. The beryllia tubule has an outer surface provided with a plurality fins made of a metal having a high heat conductivity for promoting heat radiation. No magnetic field is applied to the beryllia tubule.

Figure 2A:
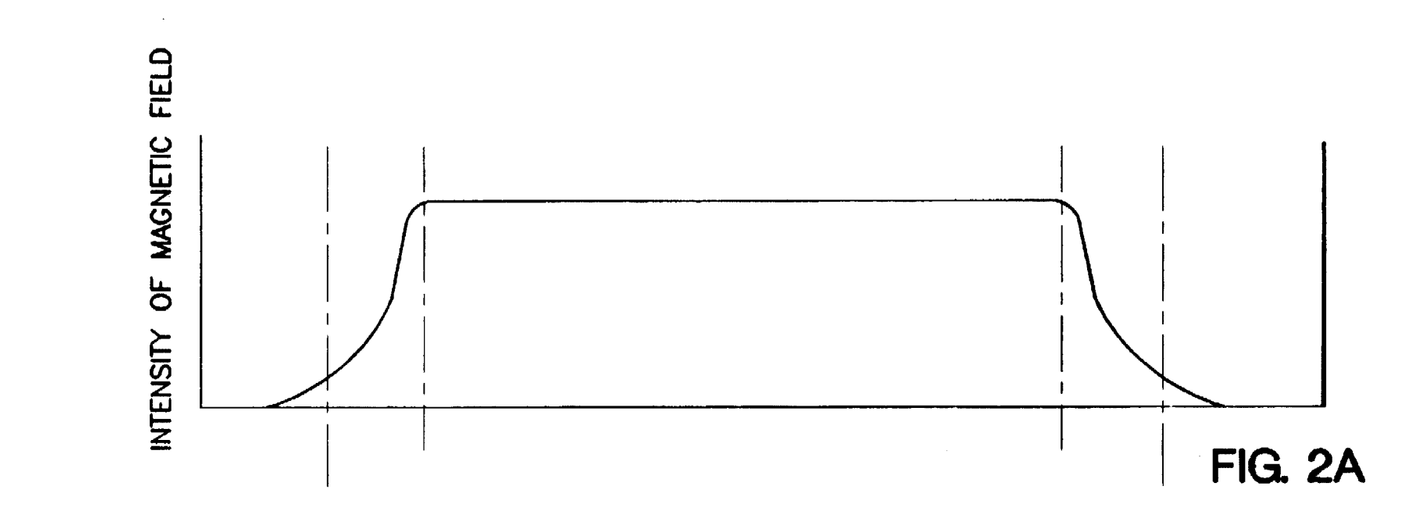
FIGS. 2A and 2B are views illustrative of a structure of an ion laser tube surrounded by an electromagnet for applying a magnetic field to the ion tube, and variations in intensity of the applied magnetic field.
Figure 2B:
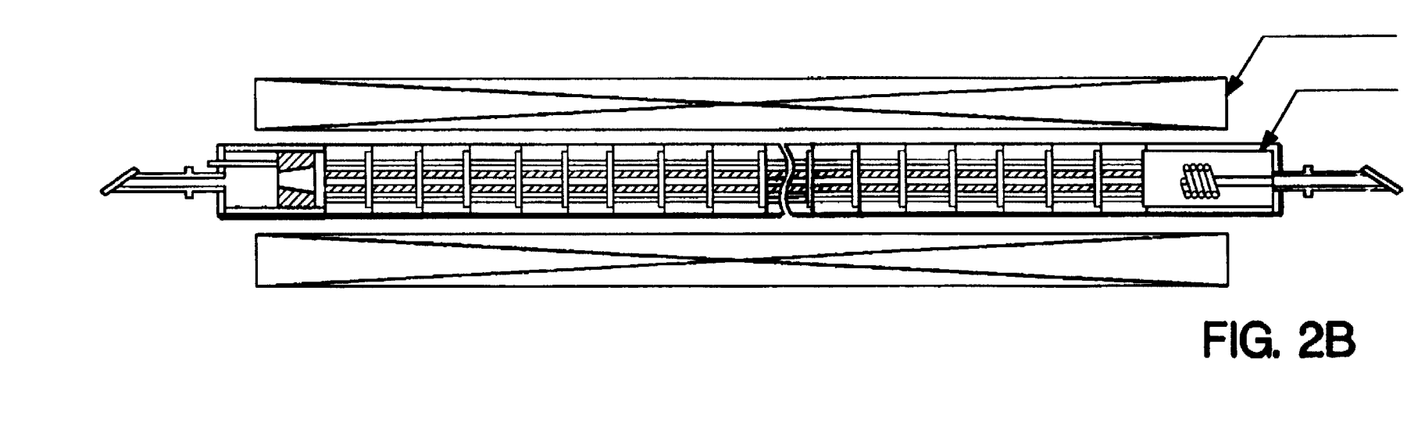

The conventional ion laser tubes of the first and second types described above are engaged with the following disadvantages. The discharge tubule is made of either silicon carbide or tungsten. The electromagnets are provided around the laser tube to apply the laser tube with the magnetic field for obtaining a confinement of the plasma gas within the discharge tubule. FIG. 2A illustrates variations in intensity of the applied magnetic field over positions in a longitudinal direction of the laser tube shown in FIG. 2B. The intensity of the applied magnetic field is uniform except for the opposite end portions of the discharge tubule. In the vicinity of the opposite ends, the intensity of the applied magnetic field is rapidly reduced. The reduced magnetic field allows the plasma gas to be diffused whereby the inner walls of the discharge tubule in the vicinity of the opposite ends thereof may be subjected to a violent sputtering by the discharge plasma. If the conventional ion laser of this type is applied with a large current, for example, in the range of 50-70 A, then the inner walls of the discharge tubule in the vicinity of the opposite ends thereof are sputtered by the discharge plasma whereby a corrosion occurs on the inner wall of the discharge tubule of the laser tube. The inner diameter of the discharge tubule is varied and the output power of the laser tube is reduced.

On the other hand, the conventional ion laser tube of the third type is also engaged with the following disadvantages.

The beryllia tubule extends except in the vicinity of the opposite ends where the magnitude of the magnetic field is reduced. Namely, the discharge tubule is not made of beryllia in the vicinity of the opposite ends where the magnitude of the magnetic field is reduced. This means that the discharge tubule has opposite end regions made of not beryllia which are subjected to the strong sputtering. For those reasons, a corrosion or an abnormal discharge may occur on the inner wall of the discharge tubule of the laser tube. The inner diameter of the discharge tubule is varied and the output power of the laser tube is reduced.

As described above, the foregoing conventional on laser tubes are not useful under the condition of the large current application and the high output power.

SUMMARY OF THE INVENTION

Accordingly, it is an object of the present invention to provide a novel ion laser tube with an improved discharge tubule free from the above problems.

It is a further object of the present invention to provide a novel ion laser tube with an improved discharge tubule adopted for a large current application and a high output.

It is a further object of the present invention to provide a novel ion laser tube with an improved discharge tubule having a long life time.

The above and other objects features and advantages of the present invention will be apparent from the following descriptions.

The present invention provides an improved discharge tubule in an ion laser tube surrounded by an electromagnet applying an electric field to the ion laser tube. The improved discharge tubule comprises an intermediate section having first and second ends, a first end section coupled with the first end of the intermediate section and a second end section coupled with the second end of the intermediate section. The first end section extends at least in a first side region where an intensity of the magnetic field is reduced from that applied to the intermediate section. The second end section extends at least in a second side region where an intensity of the magnetic field is reduced from that applied to the intermediate section. The first section is made of a first material selected from the group consisting of titanium carbide (TiC), beryllia (BeO) and boron carbide ($B_4C$). The second section is made of a second material selected from the group consisting of titanium carbide (TiC), beryllia (BeO) and boron carbide ($B_4C$).

Figure 3:
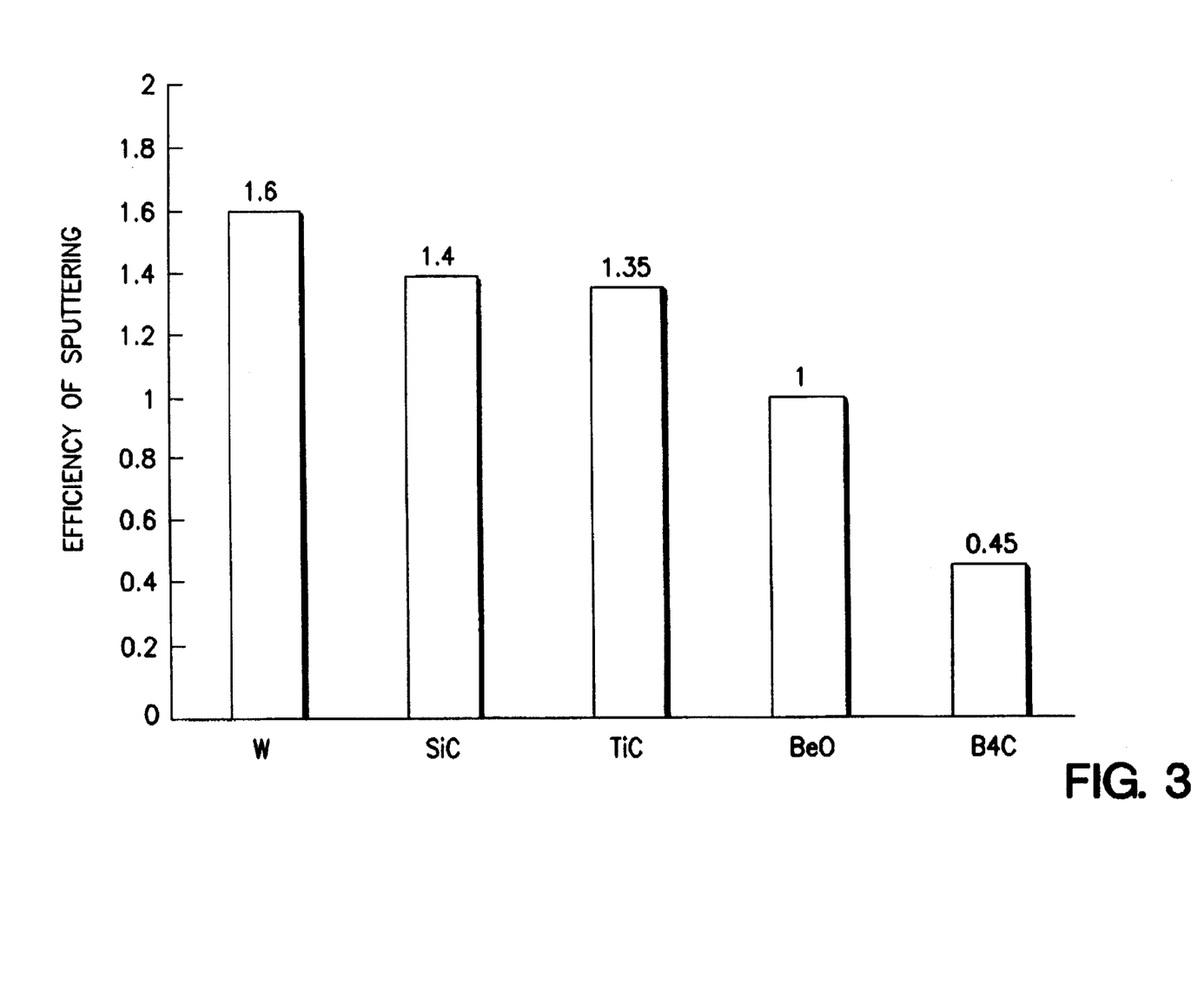
FIG. 3 is a diagram illustrative of sputtering coefficients of various materials, for example, W, SiC, TiC, BeO, and $B_4C$ used for a discharge tubule of an ion laser tube.

FIG. 3 illustrates sputtering coefficients of tungsten (W), silicon carbide (SiC), beryllia (BeO) and boron carbide ($B_4C$). Lower sputtering coefficient means that the material have a higher resistivity to the sputtering. Silicon carbide (SiC) has a higher resistivity to the sputtering than that of tungsten (W). Titanium carbide (TiC) has a higher resistivity to the sputtering than that of silicon carbide (SiC). Beryllia (BeO) has a higher resistivity to the sputtering than that of titanium carbide (TiC). Boron carbide ($B_4C$) has a higher resistivity to the sputtering than that of beryllia (BeO).

According to the present invention, the discharge tubule has improved first and second side portions made of a material having a higher resisitvity to the sputtering, for example, any of titanium carbide (TiC), beryllia (BeO) and boron carbide ($B_4C$), wherein the first and second side portions are exposed to a strong sputtering by a plasma gas generated by a large current discharge. The selected material of any of the titanium carbide (TiC), beryllia (BeO) and boron carbide ($B_4C$) makes the discharge tubule free from receiving any damage due to the strong sputtering by the plasma gas generated by the large current discharge and further free from any deformation thereof. This ensures that the ion laser tube has a long life time.

BRIEF DESCRIPTIONS OF THE DRAWINGS

Preferred embodiments of the present invention will be described in detail with reference to the accompanying drawings.

DISCLOSURE OF THE INVENTION

The present invention provides a discharge tubule in an ion laser tube surrounded by an electromagnet applying an electric field to the ion laser tube. The discharge tubule comprises an intermediate section having first and second ends, a first end section coupled with the first end of the intermediate section and a second end section coupled with the second end of the intermediate section. The first end section extends at least in a first side region where an intensity of the magnetic field is reduced from that applied to the intermediate section. The second end section extends at least in a second side region where an intensity of the magnetic field is reduced from that applied to the intermediate section. The first section is made of a first material selected from the group consisting of titanium carbide (TiC), beryllia (BeO) and boron carbide ($B_4C$) as well as the second section is made of a second material selected from the group consisting of titanium carbide (TiC), beryllia (BeO) and boron carbide ($B_4C$).

The intensity of the magnetic field is reduced in the end regions where the end complex tubular structures are provided. The reduced intensity of the magnetic field causes a strong sputtering by the plasma gas to the inner wall of the discharge tubule. Namely, the inner tubules made of titanium carbide (TiC), beryllia (BeO) or boron carbide ($B_4C$) are exposed to the strong sputtering. As described above, however, the inner tubules of titanium carbide (TiC), beryllia (BeO) or boron carbide ($B_4C$) have a higher resistivity to the sputtering by the plasma gas than that of the inner tubule of silicon carbide (SiC). For this reason, the inner tubules of titanium carbide (TiC), beryllia (BeO) or boron carbide. ($B_4C$) is free from any damage due to the strong sputtering by the plasma gas applied with the reduced magnetic field as well as free of any deformation thereof. The inner tubule of silicon carbide (SiC) is exposed to a week sputtering by the plasma gas strongly confined by the strong magnetic field. For this reason, the inner tubule of silicon carbide (SiC) is also free from any damage due to the strong sputtering by the plasma gas applied with the reduced magnetic field as well as free of any deformation thereof. This means that the discharge tubule is free from any damage due to the strong sputtering by the plasma gas applied with the reduced magnetic field as well as free of any deformation thereof.

The present invention provides another discharge tubule in an ion laser tube surrounded by an electromagnet applying an electric field to the ion laser tube. The discharge tubule comprises an intermediate section being made of silicon carbide and having first and second ends, a first end section coupled with the first end of the intermediate section and a second end section coupled with the second end of the intermediate section. The first end section extends at least in a first side region where an intensity of the magnetic field is reduced from that applied to the intermediate section. The second end section extending at least in a second side region where an intensity of the magnetic field is reduced from that applied to the intermediate section. The first section is made of a first material having a larger sputtering resistivity than a sputtering resistivity of silicon carbide as well as the second section is made of a second material having a larger sputtering resistivity than the sputtering resistivity of silicon carbide. In this case, the first material is one selected from the group consisting of titanium carbide (TiC), beryllia (BeO) and boron carbide ($B_4C$) as well as the second material is one selected from the group consisting of titanium carbide (TiC), beryllia (BeO) and boron carbide ($B_4C$).

The intensity of the magnetic field is reduced in the end regions where the end complex tubular structures are provided. The reduced intensity of the magnetic field causes a strong sputtering by the plasma gas to the inner wall of the discharge tubule. Namely, the inner tubules made of titanium carbide (TiC), beryllia (BeO) or boron carbide ($B_4C$) are exposed to the strong sputtering. As described above, however, the inner tubules of titanium carbide (TiC), beryllia (BeO) or boron carbide ($B_4C$) have a higher resistivity to the sputtering by the plasma gas than that of the inner tubule of silicon carbide (SiC). For this reason, the inner tubules of titanium carbide (TiC), beryllia (BeO) or boron carbide ($B_4C$) is free from any damage due to the strong sputtering by the plasma gas applied with the reduced magnetic field as well as free of any deformation thereof. The inner tubule of silicon carbide (SiC) is exposed to a week sputtering by the plasma gas strongly confined by the strong magnetic field. For this reason, the inner tubule of silicon carbide (SiC) is also free from any damage due to the strong sputtering by the plasma gas applied with the reduced magnetic field as well as free of any deformation thereof. This means that the discharge tubule is free from any damage due to the strong sputtering by the plasma gas applied with the reduced magnetic field as well as free of any deformation thereof.

The present invention also provides an ion laser tube surrounded by an electromagnet applying an electric field to the ion laser tube. The ion laser tube has a discharge tubule. The discharge tubule comprises an intermediate section having first and second ends, a first end section coupled with the first end of the intermediate section and a second end section coupled with the second end of the intermediate section. The first end section extends at least in a first side region where an intensity of the magnetic field is reduced from that applied to the intermediate section. The second end section extends at least in a second side region where an intensity of the magnetic field is reduced from that applied to the intermediate section. The first section is made of a first material selected from the group consisting of titanium carbide (TiC), beryllia (BeO) and boron carbide ($B_4C$) as well as the second section is made of a second material selected from the group consisting of titanium carbide (TiC), beryllia (BeO) and boron carbide ($B_4C$).

The intensity of the magnetic field is reduced in the end regions where the end complex tubular structures are provided. The reduced intensity of the magnetic field causes a strong sputtering by the plasma gas to the inner wall of the discharge tubule. Namely, the inner tubules made of titanium carbide (TiC), beryllia (BeO) or boron carbide ($B_4C$) are exposed to the strong sputtering. As described above, however, the inner tubules of titanium carbide (TiC), beryllia (BeO) or boron carbide ($B_4C$) have a higher resistivity to the sputtering by the plasma gas than that of the inner tubule of silicon carbide (SiC). For this reason, the inner tubules of titanium carbide (TiC), beryllia (BeO) or boron carbide ($B_4C$) is free from any damage due to the strong sputtering by the plasma gas applied with the reduced magnetic field as well as free of any deformation thereof. The inner tubule of silicon carbide (SiC) is exposed to a week sputtering by the plasma gas strongly confined by the strong magnetic field. For this reason, the inner tubule of silicon carbide (SiC) is also free from any damage due to the strong sputtering by the plasma gas applied with the reduced magnetic field as well as free of any deformation thereof. This means that the discharge tubule is free from any damage due to the strong sputtering by the plasma gas applied with the reduced magnetic field as well as free of any deformation thereof.

The present invention also provides another ion laser tube surrounded by an electromagnet applying an electric field to the ion laser tube. The ion laser tube has a discharge tubule. The discharge tubule comprises an intermediate section made of silicon carbide and having first and second ends, a first end section coupled with the first end of the intermediate section and a second end section coupled with the second end of the intermediate section. The first end section extends at least in a first side region where an intensity of the magnetic field is reduced from that applied to the intermediate section. The second end section extends at least in a second side region where an intensity of the magnetic field is reduced from that applied to the intermediate section. The first section is made of a first material having a larger sputtering resistivity than a sputtering resistivity of silicon carbide as well as the second section is made of a second material having a larger sputtering resistivity than the sputtering resistivity of silicon carbide. In this case, the first material is one selected from the group consisting of titanium carbide (TiC), beryllia (BeO) and boron carbide ($B_4C$) as well as the second material is titanium carbide (TiC), beryllia (BeO) or boron carbide ($B_4C$).

The intensity of the magnetic field is reduced in the end regions where the end complex tubular structures are provided. The reduced intensity of the magnetic field causes a strong sputtering by the plasma gas to the inner wall of the discharge tubule. Namely, the inner tubules made of titanium carbide (TiC), beryllia (BeO) or boron carbide ($B_4C$) are exposed to the strong sputtering. As described above, however, the inner tubules of titanium carbide (TiC), beryllia (BeO) or boron carbide ($B_4C$) have a higher resistivity to the sputtering by the plasma gas than that of the inner tubule of silicon carbide (SiC). For this reason, the inner tubules of titanium carbide (TiC), beryllia (BeO) or boron carbide ($B_4C$) is free from any damage due to the strong sputtering by the plasma gas applied with the reduced magnetic field as well as free of any deformation thereof. The inner tubule of silicon carbide (SiC) is exposed to a week sputtering by the plasma gas strongly confined by the strong magnetic field. For this reason, the inner tubule of silicon carbide (SiC) is also free from any damage due to the strong sputtering by the plasma gas applied with the reduced magnetic field as well as free of any deformation thereof. This means that the discharge tubule is free from any damage due to the strong sputtering by the plasma gas applied with the reduced magnetic field as well as free of any deformation thereof.

PREFERRED EMBODIMENTS

Figure 4:
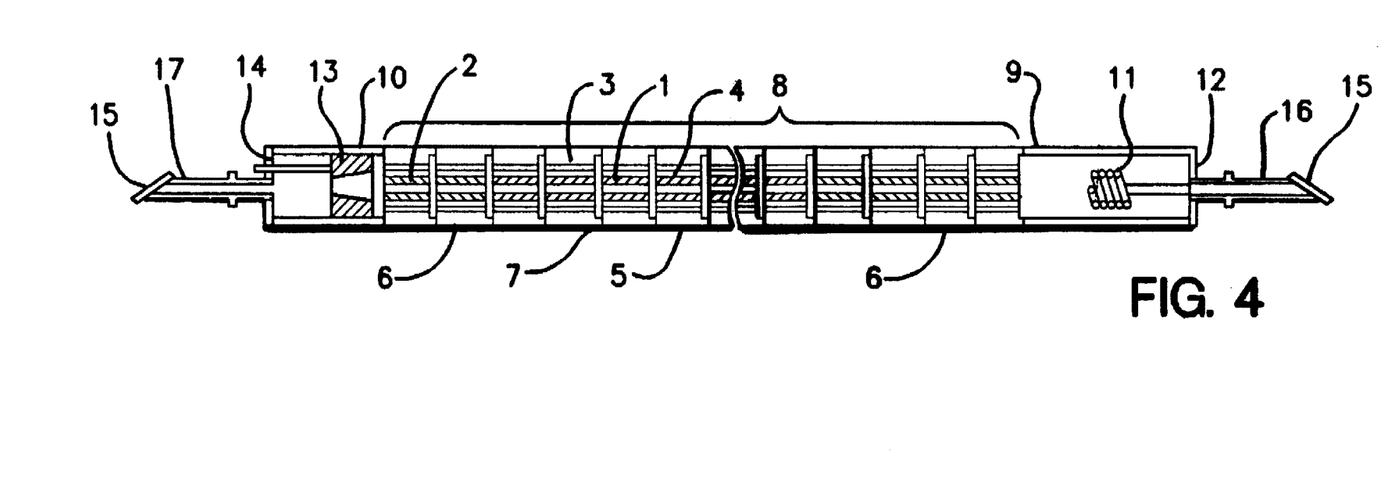
FIG. 4 is a cross sectional elevation view illustrative of a novel ion laser tube in a first embodiment according to the present invention.

A first embodiment according to the present invention will be described with reference to FIG. 4 in which the ion laser tube has a main tubular body 8 having opposite ends, both of which are coupled with an anode accommodating tube 10 and a cathode accommodating tube 9. The anode accommodating tube 10 has the same outer diameter as the main tubular body 8. The cathode accommodating tube 9 has the same outer diameter as the main tubular body 8. The cathode and anode accommodating tubes 9 and 10 are made of aluminum nitride (AlN) which has a high thermal conductivity. The high thermal conductivity of the cathode and anode accommodating tubes 9 and 10 allows a heat radiation at a high efficiency. The cathode accommodating tube 9 accommodates a cathode 11. The anode accommodating tube 10 accommodates an anode 13. The cathode 11 is supported by a cathode supporting member 12 which is mounted with the end of the cathode accommodating tube 9. The anode 14 is supported by an anode supporting member 14 which is mounted with the end of the anode accommodating tube 10. A glass tube 16 is coupled with the cathode supporting member 12. A glass tube 17 is coupled with the anode supporting member 14. The glass tubes 16 and 17 have the same outer diameter as each other but smaller than the outer diameter of the cathode accommodating tube 9 and the anode accommodating tube 10. The end of each of the glass tubes 16 and 17 is provided with an optical window 15.

The main tubular body 8 comprises a center complex tubular structure 5 and two end complex tubular structures 6 both of which are respectively united with opposite ends of the center complex tubular structure 5. The center complex tubular structure 5 has the same outer diameter as the two end complex tubular structures 6. The center complex tubular structure 5 comprises an outer tube 4 made of aluminum nitride (AlN) and an inner tubule 1 made of silicon carbide (SiC). The outer tube 4 has a larger inner diameter of than an outer diameter of the inner tubule 1 so that the outer tube 4 accommodates the inner tubule 1. The outer diameter of the inner tubule 1 is 9.99 mm. The inner diameter of the inner tubule 1 is 2.5 mm. The outer tube 4 and the inner tubule 1 are coaxially positioned. Each of the two end complex tubular structures 6 comprises an outer tube 4 made of aluminum nitride (AlN) and an inner tubule 2 made of beryllia (BeO). The outer tube 4 and the inner tubule 2 are also coaxially positioned. The outer tube 4 has a larger inner diameter than an outer diameter of the inner tubule 2 so that the outer tube 4 accommodates the inner tubule 2. The outer diameter of the inner tubule 2 is 35 mm. The inner diameter of the inner tubule 1 is 10 mm. The inner tubule 1 made of silicon carbide (SiC) in combination with the inner tubule 2 made of beryllia (BeO) forms a discharge tubule. A gas feedback passage 3 is provided within walls of the outer tube 4. Namely, the gas feedback passage 3 comprises a plurality of through holes provided within the tubular wall of the outer tube 4. The through holes have a diameter of 1.9 mm. The discharge tubule may be fixed to the outer tube 4 either through a glass member not illustrated or mechanically. The center complex tubular structure 5 comprises a plurality of center complex tubular units which are coaxitally aligned via sealing glass members 7 by use of a jig. The end complex tubular structures 6 also comprises a plurality of end complex tubular units which are coaxitally aligned via sealing glass members 7 by use of a jig. The length of the center complex tubular unit is 25 mm. The length of the end complex tubular unit is 27 mm. The numbers of the center complex tubular units and the end complex tubular units are determined so that the main tubular body 8 has a length of, for example, 400 mm when the laser output is 4 W or 1200 mm when the laser output is 40 W. The end complex tubular structure 6 in the side of cathode comprises 3-5 of the end complex tubular units, whilst the end complex tubular structure 6 in the side of anode comprises 1-2 of the end complex tubular units since the sputtering by the plasma gas in the cathode side is stronger than that in the anode side. Argon gas is contained in the above laser tube.

Further, an electromagnet not illustrated is provided around the main tubular body 8 for applying a magnetic field to plasma gases confined in the discharge tubule. The intensity of the magnetic field is reduced in the end regions where the end complex tubular structures are provided. The reduced intensity of the magnetic field causes a strong sputtering by the plasma gas to the inner wall of the discharge tubule. Namely, the inner tubules made of beryllia (BeO) are exposed to the strong sputtering. As described above, however, the inner tubules 2 of beryllia (BeO) have a higher resistivity to the sputtering by the plasma gas than that of the inner tubule 1 of silicon carbide (SiC). For this reason, the inner tubules 2 of beryllia (BeO) is free from any damage due to the strong sputtering by the plasma gas applied with the reduced magnetic field as well as free of any deformation thereof. The inner tubule 1 of silicon carbide (SiC) is exposed to a week sputtering by the plasma gas strongly confined by the strong magnetic field. For this reason, the inner tubule 1 of silicon carbide (SiC) is also free from any damage due to the strong sputtering by the plasma gas applied with the reduced magnetic field as well as free of any deformation thereof. This means that the discharge tubule is free from any damage due to the strong sputtering by the plasma gas applied with the reduced magnetic field as well as free of any deformation thereof.

It was confirmed that the above discharge tubule is responsible to a large current in the range of 60–70 A. The laser output measured was 40 W. Almost no reduction in the magnitude of the output was observed. When the laser was applied with a large discharge current of 60 A for 3000 hours, a small reduction of not more than 10% in the output of the laser and no deterioration of mode of the laser were observed. When the above laser was applied with a large discharge current of 30 A, the life time measured was not less than 6000 hours. By contrast, when the conventional laser was applied with a large discharge current of 30 A, the life time measured was about 3000 hours.

Figure 5:
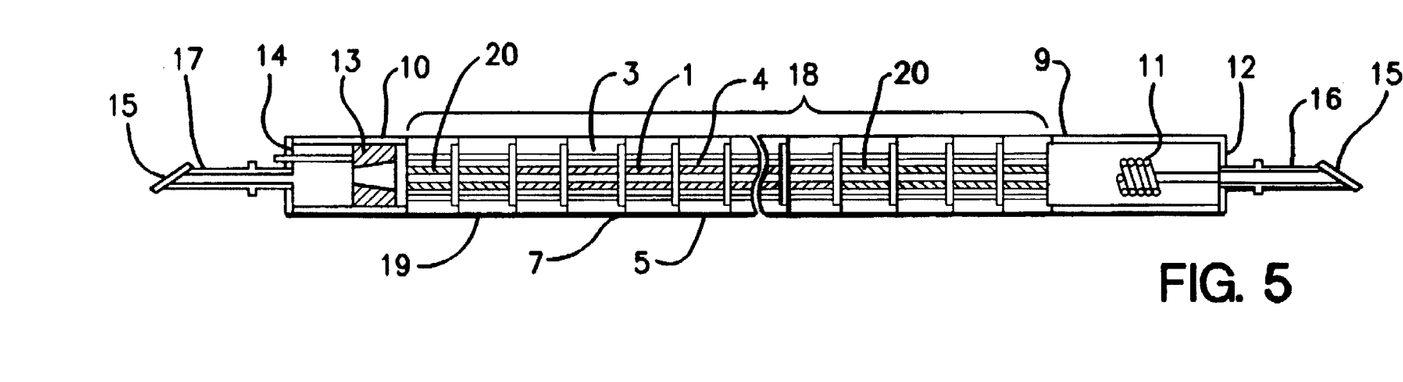
FIG. 5 is a cross sectional elevation view illustrative of a novel ion laser tube in a second embodiment according to the present invention.

A second embodiment according to the present invention will be described with reference to FIG. 5 in which the ion laser tube has a main tubular body 18 having opposite ends, both of which are coupled with an anode accommodating tube 10 and a cathode accommodating tube 9. The anode accommodating tube 10 has the same outer diameter as the main tubular body 18. The cathode accommodating tube 9 has the same outer diameter as the main tubular body 18. The cathode and anode accommodating tubes 9 and 10 are made of aluminum nitride (AlN) which has a high thermal conductivity. The high thermal conductivity of the cathode and anode accommodating tubes 9 and 10 allows a heat radiation at a high efficiency. The cathode accommodating tube 9 accommodates a cathode 11. The anode accommodating tube 10 accommodates an anode 13. The cathode 11 is supported by a cathode supporting member 12 which is mounted with the end of the cathode accommodating tube 9. The anode 14 is supported by an anode supporting member 14 which is mounted with the end of the anode accommodating tube 10. A glass tube 16 is coupled with the cathode supporting member 12. A glass tube 17 is coupled with the anode supporting member 14. The glass tubes 16 and 17 have the same outer diameter as each other but smaller than the outer diameter of the cathode accommodating tube 9 and the anode accommodating tube 10. The end of each of the glass tubes 16 and 17 is provided with an optical window 15.

The main tubular body 18 comprises a center complex tubular structure 5 and two end complex tubular structures 19 both of which are respectively united with opposite ends of the center complex tubular structure 5. The center complex tubular structure 5 has the same outer diameter as the two end complex tubular structures 19. The center complex tubular structure 5 comprises an outer tube 4 made of aluminum nitride (AlN) and an inner tubule 1 made of silicon carbide (SiC). The outer tube 4 has a larger inner diameter of than an outer diameter of the inner tubule 1 so that the outer tube 4 accommodates the inner tubule 1. The outer diameter of the inner tubule 1 is 9.99 mm. The inner diameter of the inner tubule 1 is 2.5 mm. The outer tube 4 and the inner tubule 1 are coaxially positioned. Each of the two end complex tubular structures 19 comprises an outer tube 4 made of aluminum nitride (AlN) and an inner tubule 20 made of boron carbide ($B_4C$). The outer tube 4 and the inner tubule 20 are also coaxially positioned. The outer tube 4 has a larger inner diameter than an outer diameter of the inner tubule 20 so that the outer tube 4 accommodates the inner tubule 20. The outer diameter of the inner tubule 20 is 35 mm. The inner diameter of the inner tubule 1 is 10 mm. The inner tubule 1 made of silicon carbide (SiC) in combination with the inner tubule 20 made of boron carbide ($B_4C$) forms a discharge tubule. A gas feedback passage 3 is provided within walls of the outer tube 4. Namely, the gas feedback passage 3 comprises a plurality of through holes provided within the tubular wall of the outer tube 4. The through holes have a diameter of 1.9 mm. The discharge tubule may be fixed to the outer tube 4 either through a glass member not illustrated or mechanically. The center complex tubular structure 5 comprises a plurality of center complex tubular units which are coaxitally aligned via sealing glass members 7 by use of a jig. The end complex tubular structures 19 also comprises a plurality of end complex tubular units which are coaxitally aligned via sealing glass members 7 by use of a jig. The length of the center complex tubular unit is 25 mm. The length of the end complex tubular unit is 27 mm. The numbers of the center complex tubular units and the end complex tubular units are determined so that the main tubular body 18 has a length of, for example, 400 mm when the laser output is 4 W or 1200 mm when the laser output is 40 W. The end complex tubular structure 19 in the side of cathode comprises 3–5 of the end complex tubular units, whilst the end complex tubular structure 19 in the side of anode comprises 1–2 of the end complex tubular units since the sputtering by the plasma gas in the cathode side is stronger than that in the anode side. Argon gas is contained in the above laser tube.

Further, an electromagnet not illustrated is provided around the main tubular body 18 for applying a magnetic field to plasma gases confined in the discharge tubule. The intensity of the magnetic field is reduced in the end regions where the end complex tubular structures are provided. The reduced intensity of the magnetic field causes a strong sputtering by the plasma gas to the inner wall of the discharge tubule. Namely, the inner tubules made of boron carbide ($B_4C$) are exposed to the strong sputtering. As described above, however, the inner tubules 20 of boron carbide ($B_4C$) have a higher resistivity to the sputtering by the plasma gas than that of the inner tubule 1 of silicon carbide (SiC). For this reason, the inner tubules 20 of boron carbide ($B_4C$) is free from any damage due to the strong sputtering by the plasma gas applied with the reduced magnetic field as well as free of any deformation thereof. The inner tubule 1 of silicon carbide (SiC) is exposed to a week sputtering by the plasma gas strongly confined by the strong magnetic field. For this reason, the inner tubule 1 of silicon carbide (SiC) is also free from any damage due to the strong sputtering by the plasma gas applied with the reduced magnetic field as well as free of any deformation thereof. This means that the discharge tubule is free from any damage due to the strong sputtering by the plasma gas applied with the reduced magnetic field as well as free of any deformation thereof.

It was confirmed that the above discharge tubule is responsible to a large current in the range of 60–70 A. The laser output measured was 40 W. Almost no reduction in the magnitude of the output was observed. When the laser was applied with a large discharge current of 60 A for 3000 hours; a small reduction of not more than 10% in the output of the laser and no deterioration of mode of the laser were observed. When the above laser was applied with a large discharge current of 30 A, the life time measured was not less than 6000 hours. By contrast, when the conventional laser was applied with a large discharge current of 30 A, the life time measured was about 3000 hours.

Figure 6:
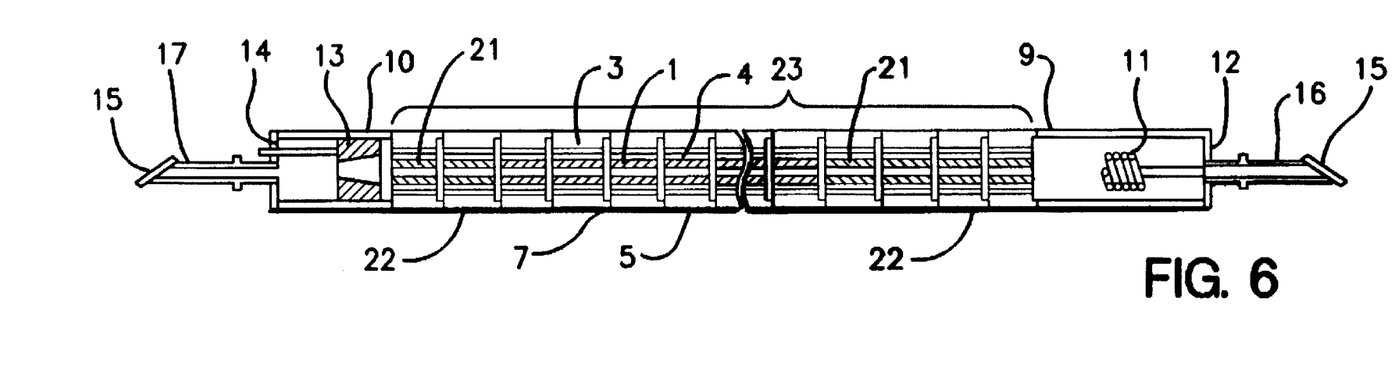
FIG. 6 is a cross sectional elevation view illustrative of a novel ion laser tube in a third embodiment according to the present invention.

A third embodiment according to the present invention will be described with reference to FIG. 6 in which the ion laser tube has a main tubular body 23 having opposite ends, both of which are coupled with an anode accommodating tube 10 and a cathode accommodating tube 9. The anode accommodating tube 10 has the same outer diameter as the main tubular body 23. The cathode accommodating tube 9 has the same outer diameter as the main tubular body 23. The cathode and anode accommodating tubes 9 and 10 are made of aluminum nitride (AlN) which has a high thermal conductivity. The high thermal conductivity of the cathode and anode accommodating tubes 9 and 10 allows a heat radiation at a high efficiency. The cathode accommodating tube 9 accommodates a cathode 11. The anode accommodating tube 10 accommodates an anode 13. The cathode 11 is supported by a cathode supporting member 12 which is mounted with the end of the cathode accommodating tube 9. The anode 14 is supported by an anode supporting member 14 which is mounted with the end of the anode accommodating tube 10. A glass tube 16 is coupled with the cathode supporting member 12. A glass tube 17 is coupled with the anode supporting member 14. The glass tubes 16 and 17 have the same outer diameter as each other but smaller than the outer diameter of the cathode accommodating tube 9 and the anode accommodating tube 10. The end of each of the glass tubes 16 and 17 is provided with an optical window 15.

The main tubular body 23 comprises a center complex tubular structure 5 and two end complex tubular structures 22 both of which are respectively united with opposite ends of the center complex tubular structure 5. The center complex tubular structure 5 has the same outer diameter as the two end complex tubular structures 22. The center complex tubular structure 5 comprises an outer tube 4 made of aluminum nitride (AlN) and an inner tubule 1 made of silicon carbide (SiC). The outer tube 4 has a larger inner diameter of than an outer diameter of the inner tubule 1 so that the outer tube 4 accommodates the inner tubule 1. The outer diameter of the inner tubule 1 is 9.99 mm. The inner diameter of the inner tubule 1 is 2.5 mm. The outer tube 4 and the inner tubule 1 are coaxially positioned. Each of the two end complex tubular structures 22 comprises an outer tube 4 made of aluminum nitride (AlN) and an inner tubule 21 made of titanium carbide (TiC). The outer tube 4 and the inner tubule 21 are also coaxially positioned. The outer tube 4 has a larger inner diameter than an outer diameter of the inner tubule 21 so that the outer tube 4 accommodates the inner tubule 21. The outer diameter of the inner tubule 21 is 35 mm. The inner diameter of the inner tubule 1 is 10 mm. The inner tubule 1 made of silicon carbide (SiC) in combination with the inner tubule 21 made of titanium carbide (TiC) forms a discharge tubule. A gas feedback passage 3 is provided within walls of the outer tube 4. Namely, the gas feedback passage 3 comprises a plurality of through holes provided within the tubular wall of the outer tube 4. The through holes have a diameter of 1–9 mm. The discharge tubule may be fixed to the outer tube 4 either through a glass member not illustrated or mechanically. The center complex tubular structure 5 comprises a plurality of center complex tubular units which are coaxially aligned via sealing glass members 7 by use of a jig. The end complex tubular structures 22 also comprises a plurality of end complex tubular units which are coaxitally aligned via sealing glass members 7 by use of a jig. The length of the center complex tubular unit is 25 mm. The length of the end complex tubular unit is 27 mm. The numbers of the center complex tubular units and the end complex tubular units are determined so that the main tubular body 23 has a length of, for example, 400 mm when the laser output is 4 W or 1200 mm when the laser output is 40 W. The end complex tubular structure 22 in the side of cathode comprises 3–5 of the end complex tubular units, whilst the end complex tubular structure 22 in the side of anode comprises 1–2 of the end complex tubular units since the sputtering by the plasma gas in the cathode side is stronger than that in the anode side. Argon gas is contained in the above laser tube.

Further, an electromagnet not illustrated is provided around the main tubular body 23 for applying a magnetic field to plasma gases confined in the discharge tubule. The intensity of the magnetic field is reduced in the end regions where the end complex tubular structures are provided. The reduced intensity of the magnetic field causes a strong sputtering by the plasma gas to the inner wall of the discharge tubule. Namely, the inner tubules made of titanium carbide (TiC) are exposed to the strong sputtering. As described above, however, the inner tubules 21 of titanium carbide (TiC) have a higher resistivity to the sputtering by the plasma gas than that of the inner tubule 1 of silicon carbide (SiC). For this reason, the inner tubules 21 of titanium carbide (TiC) is free from any damage due to the strong sputtering by the plasma gas applied with the reduced magnetic field as well as free of any deformation thereof. The inner tubule 1 of silicon carbide (SiC) is exposed to a week sputtering by the plasma gas strongly confined by the strong magnetic field. For this reason, the inner tubule 1 of silicon carbide (SiC) is also free from any damage due to the strong sputtering by the plasma gas applied with the reduced magnetic field as well as free of any deformation thereof. This means that the discharge tubule is free from any damage due to the strong sputtering by the plasma gas applied with the reduced magnetic field as well as free of any deformation thereof.

It was confirmed that the above discharge tubule is responsible to a large current in the range of 60–70 A. The laser output measured was 40 W. Almost no reduction in the magnitude of the output was observed. When the laser was applied with a large discharge current of 60 A for 3000 hours, a small reduction of not more than 10% in the output of the laser and no deterioration of mode of the laser were observed. When the above laser was applied with a large discharge current of 30 A, the life time measured was not less than 6000 hours. By contrast, when the conventional laser was applied with a large discharge current of 30 A, the life time measured was about 3000 hours.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claim any modifications which fall within the spirit and scope of the invention.

What is claimed is:

1. A discharge tubule in an ion laser tube surrounded by an electromagnet applying an electric field to said ion laser tube, said discharge tubule comprising an intermediate section having first and second ends, a first end section coupled with said first end of said intermediate section and a second end section coupled with said second end of said intermediate section, said first end section extending at least in a first side region where an intensity of said magnetic field is reduced from that applied to said intermediate section, said second end section extending at least in a second side region where an intensity of said magnetic field is reduced from that applied to said intermediate section, wherein said first section is made of a first material selected from the group consisting of titanium carbide (TiC), beryllia (BeO) and boron carbide ($B_4C$) as well as said second section is made of a second material selected from the group consisting of titanium carbide (TiC), beryllia (BeO) and boron carbide ($B_4C$).

2. A discharge tubule in an ion laser tube surrounded by an electromagnet applying an electric field to said ion laser tube, said discharge tubule comprising an intermediate section made of silicon carbide and having first and second ends, a first end section coupled with said first end of said intermediate section and a second end section coupled with said second end of said intermediate section, said first end section extending at least in a first side region where an intensity of said magnetic field is reduced from that applied to said intermediate section, said second end section extending at least in a second side region where an intensity of said magnetic field is reduced from that applied to said intermediate section, wherein said first section is made of a first material having a larger sputtering resistivity than a sputtering resistivity of silicon carbide, and wherein said second section is made of a second material having a larger sputtering resistivity than said sputtering resistivity of silicon carbide.

3. The discharge tubule as claimed in claim 2, wherein said first material is one selected from the group consisting of titanium carbide (TiC), beryllia (BeO) and boron carbide ($B_4C$).

4. The discharge tubule as claimed in claim 2, wherein said second material is one selected from the group consisting of titanium carbide (TiC), beryllia (BeO) and boron carbide ($B_4C$).

5. An ion laser tube surrounded by an electromagnet applying an electric field to said ion laser tube, said ion laser tube having a discharge tubule, said discharge tubule comprising an intermediate section having first and second ends, a first end section coupled with said first end of said intermediate section and a second end section coupled with said second end of said intermediate section, said first end section extending at least in a first side region where an intensity of said magnetic field is reduced from that applied to said intermediate section, said second end section extending at least in a second side region where an intensity of said magnetic field is reduced from that applied to said intermediate section, wherein said first section is made of a first material selected from the group consisting of titanium carbide (TiC), beryllia (BeO) and boron carbide ($B_4C$) as well as said second section is made of a second material selected from the group consisting of titanium carbide (TiC), beryllia (BeO) and boron carbide ($B_4C$).

6. An ion laser tube surrounded by an electromagnet applying an electric field to said ion laser tube, said ion laser tube having a discharge tubule, said discharge tubule comprising an intermediate section made of silicon carbide and having first and second ends, a first end section coupled with said first end of said intermediate section and a second end section coupled with said second end of said intermediate section, said first end section extending at least in a first side region where an intensity of said magnetic field is reduced from that applied to said intermediate section, said second end section extending at least in a second side region where an intensity of said magnetic field is reduced from that applied to said intermediate section, wherein said first section is made of a first material having a larger sputtering resistivity than a sputtering resistivity of silicon carbide, and wherein said second section is made of a second material having a larger sputtering resistivity than said sputtering resistivity of silicon carbide.

7. The ion laser tube as claimed in claim 6, wherein said first material is one selected from the group consisting of titanium carbide (TiC), beryllia (BeO) and boron carbide ($B_4C$).

8. The ion laser tube as claimed in claim 6, wherein said second material is one selected from the group consisting of titanium carbide (TiC), beryllia (BeO) and boron carbide ($B_4C$).

* * * * *